INVENTOR.
WILLIAM J. BESLER
BY Owen and Hardy
ATTORNEYS.

Jan. 13, 1942.   W. J. BESLER   2,269,705
BOILER CONTROL SYSTEM
Filed Sept. 21, 1937   4 Sheets-Sheet 2

INVENTOR.
WILLIAM J. BESLER
BY Owen and Hardy
ATTORNEYS.

Jan. 13, 1942.  W. J. BESLER  2,269,705
BOILER CONTROL SYSTEM
Filed Sept. 21, 1937  4 Sheets-Sheet 3
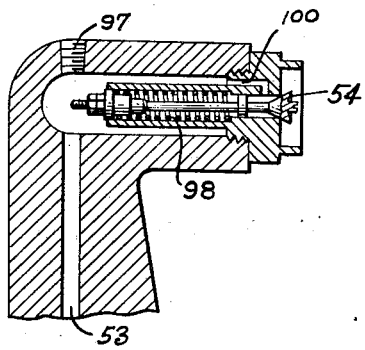
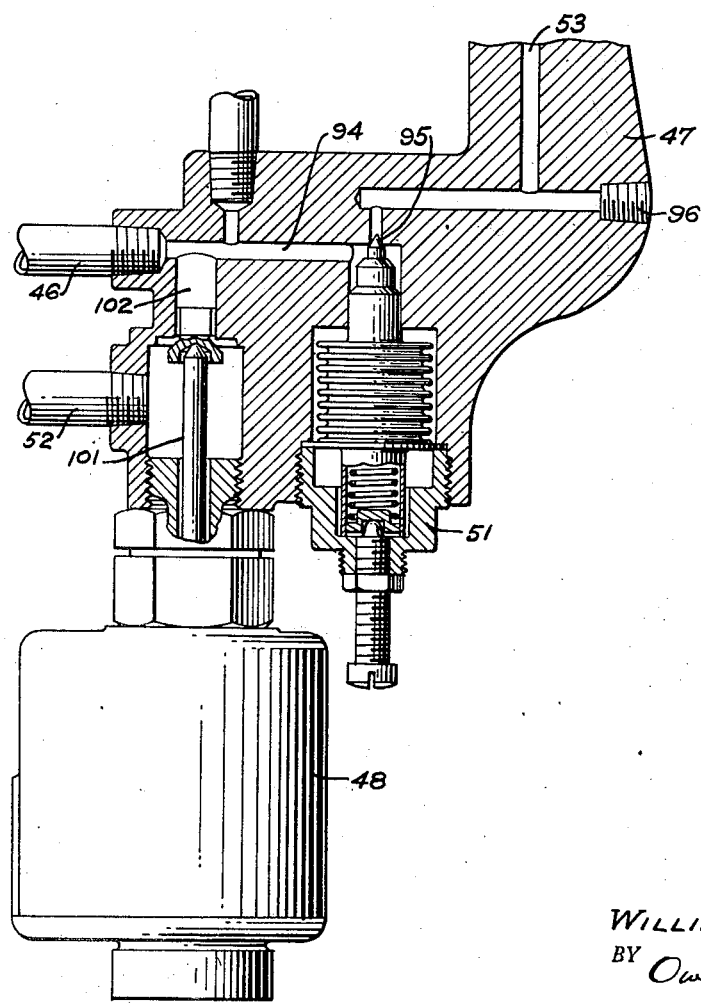
INVENTOR.
WILLIAM J. BESLER
BY Owen and Hardy
ATTORNEYS.

Jan. 13, 1942.    W. J. BESLER    2,269,705
BOILER CONTROL SYSTEM
Filed Sept. 21, 1937    4 Sheets-Sheet 4
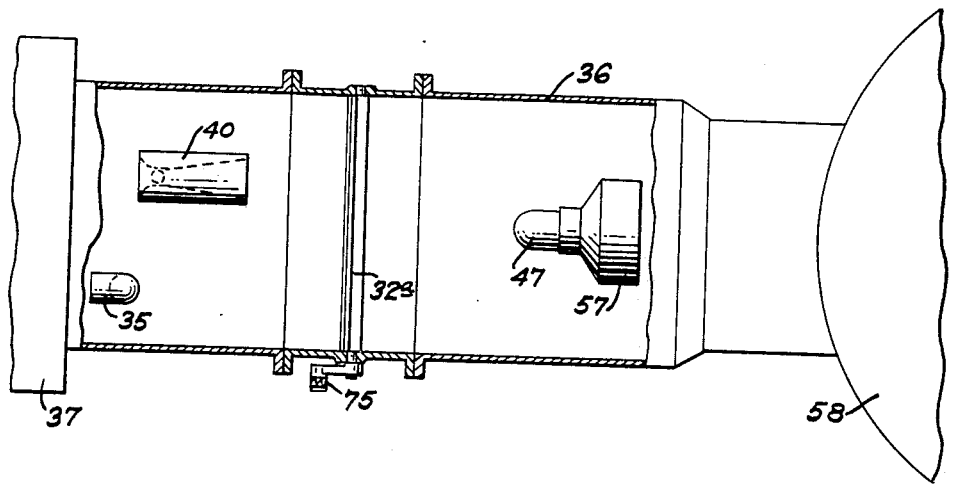
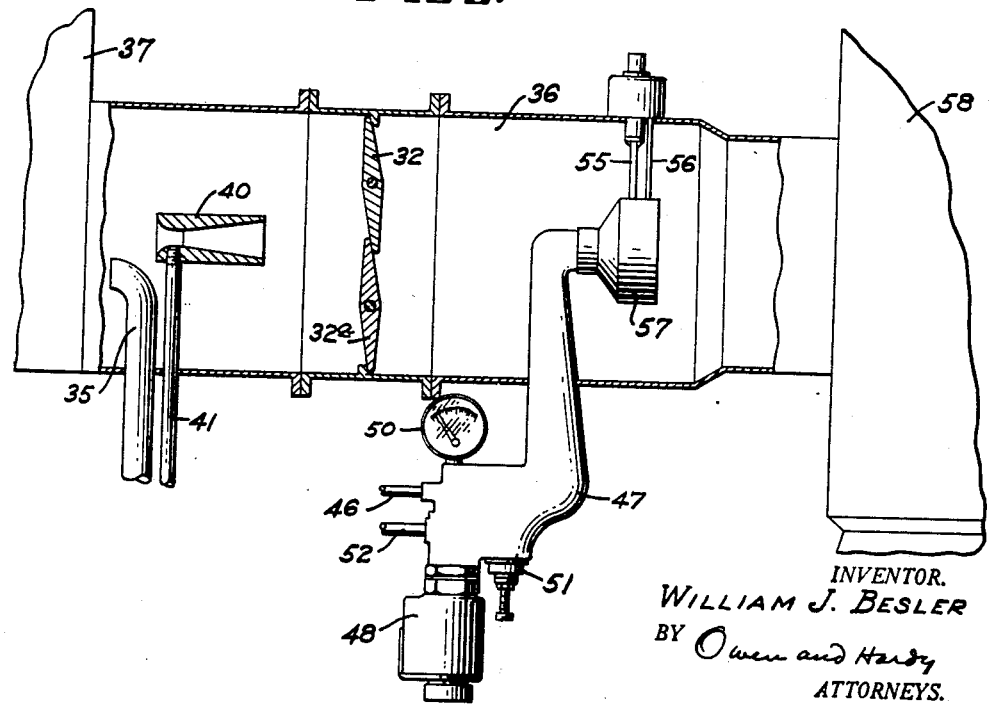
INVENTOR.
WILLIAM J. BESLER
BY Owen and Hardy
ATTORNEYS.

Patented Jan. 13, 1942

2,269,705

UNITED STATES PATENT OFFICE 2,269,705

BOILER CONTROL SYSTEM

William J. Besler, Plainfield, N. J.

Application September 21, 1937, Serial No. 164,893

20 Claims. (Cl. 158—1)

This invention relates to boiler control systems and more particularly to a system where liquid fuel is used to supply the requisite heat.

Among the objects of this invention is to provide a control system where each of the elements responds and reacts to each of the other elements to accomplish a quick, automatic and accurate control; to provide a system or method of boiler control which will automatically and without adjustment, meter the fuel supply in proportion to the quantity of air which flows to the combustion space; to provide accurate and reliable safety means in such a system whereby the cessation of the flow of air will cut off the supply of fuel; to provide a control method whereby failure at any one of the elements will not result in an oversupply of fuel at the burner and cause serious trouble; to supply such a control method which will readily and instantly be adaptable to variations in the flow of air to the burner such as occur in railroad vehicles when encountering sudden high wind currents and to compensate for fluctuation in static pressures which may occur between the inlets and outlets of a boiler, for instance, when the system is used in a railroad vehicle, while passing in and out of tunnels; to supply a burner assembly which is reliable and which is suitable for many types of application; to supply and provide a central and readily adjusted method adapted to supply fuel in the system over a wide variation of quantity, and with maximum efficiency.

The invention contemplates such other and further objects as will appear as the description of the invention proceeds.

In attaining the foregoing objects, together with such further benefits, advantages, and capabilities as may hereafter appear and as are inherently possessed thereby, there is used by way of example only the construction shown in preferred form in the accompanying four sheets of drawings, in which similar parts are designated by the same reference characters in the several views.

Referring now to the drawings:

Fig. 5 is a detail partly in vertical section of the burner assembly;

Fig. 6 is a diagrammatic representation in side elevation showing the assembly and one arrangement of parts along the air duct to the boiler; and Fig. 7 is a view similar to that of Fig. 6 but in top plan view.

Figure 1:
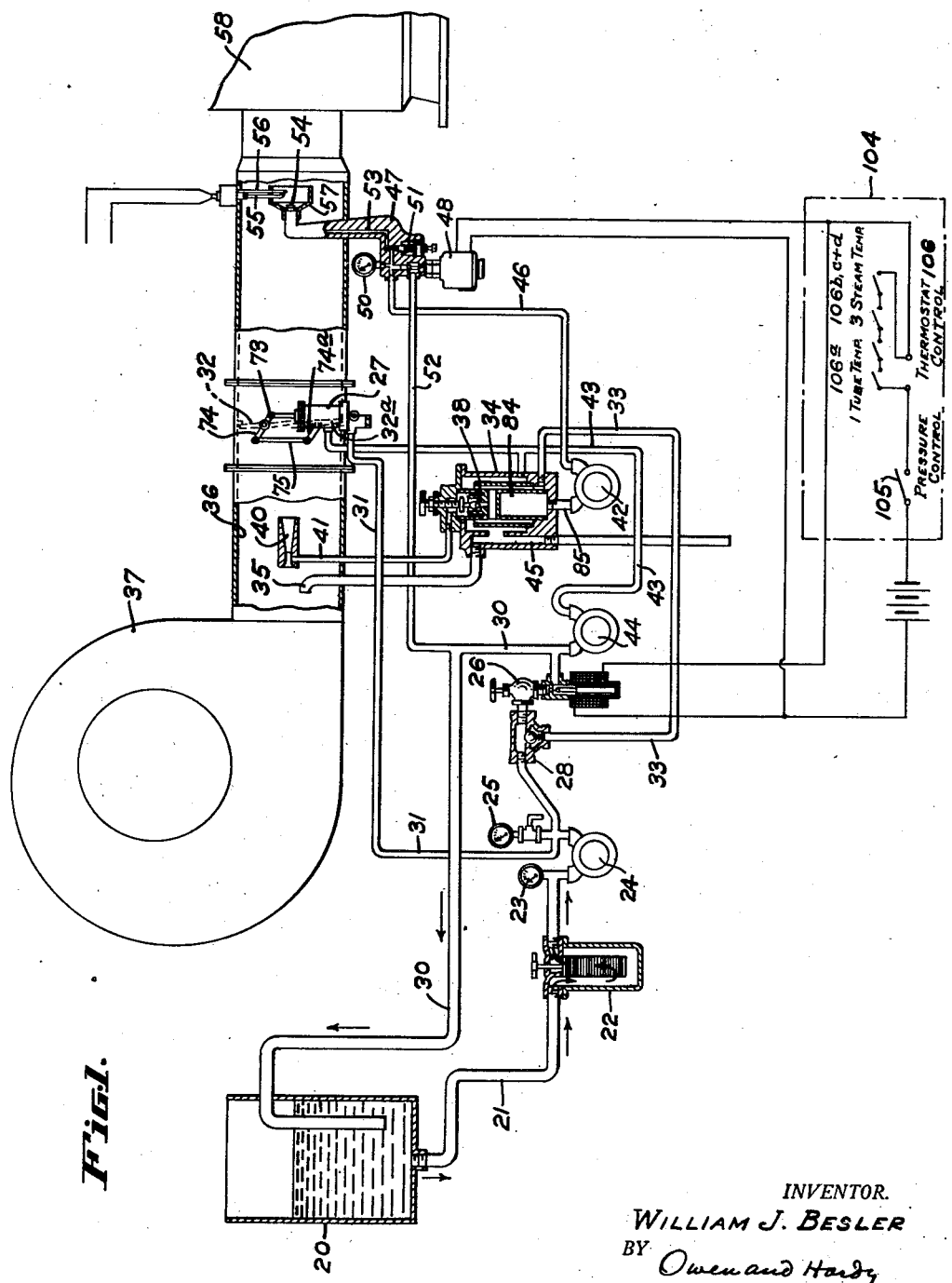
Fig. 1 is a diagrammatic representation of the complete system.

Referring now to the drawings, and particularly to the diagrammatic representation of Fig. 1, fuel flows from the tank or reservoir 20 through pipe 21, to fuel strainer 22. Between the strainer and the fuel supply pump 24, there is a gauge to indicate any possible clogging of the line. The fuel supply pump is also equipped with a gauge 25 to indicate the pressure of fuel delivery. The fuel pumped by the pump 24 has a choice of two directions of travel, as the supply line branches. One branch conducts the fuel to the piston in the damper operating assembly 27 and the other to an electrically or otherwise controlled by-pass valve 26 just beyond a spring loaded by-pass valve 28.

If the electrically controlled by-pass valve 26 has been actuated so that the valve is open, then the fuel will flow through the valve into the fuel return line 30 and thence pumped back to the fuel tank or reservoir 20. In this manner the fuel is short-circuited and never reaches the burner or other control means of the system. However, the normal operation requires this valve 26 to be closed. When the by-pass valve 26 is closed, the fuel supply pump builds up a pressure in the line and particularly this pressure is built up in the line 31 to the damper actuating means 27. The pressure so built up will actuate the piston to open the damper draft 32, all of which will be explained in greater detail as the description herein progresses. Upon the opening of the draft damper 32, fuel will flow through the spring loaded by-pass valve 28 which is a damper pressure release valve, and which is set at a pressure slightly more than that required to actuate the piston in the damper assembly 27, which setting is usually about 50 lbs. With the opening of the valve 28, the fuel supply then flows through the valve and then through line 33 to the metering chamber assembly 34. As the fuel flows into the metering chamber it is subjected to air pressure which is conducted to the metering chamber by impact pressure tube 35 which is interposed in the air duct 36 leading from the conventional centrifugal blower 37. Beyond the adjustable metering orifice 38 there is a negative pressure induced by the Venturi tube 40 and conveyed by connection 41. By this means properly metered fuel and air is ready for delivery from the central chamber 84 to the system by means of fuel delivery pump 42. The difference in air pressure not only aids in the proper mixture, but also promotes the flow of fuel through the metering orifice, through the chamber and to the delivery pump. It is immaterial whether the two air pressure devices, i. e., the impact pressure tube and the Venturi tube, are on the burner side or otherwise as the pressure differences within the metering chamber are produced only by the flow of air within the duct 36, and the relation of the two pressures always remains constant.

The metering chamber 34 is provided with an overflow as will hereafter be explained in detail, from which fuel is returned by a connecting line 43 to a scavenger pump 44, and thence by line 30 back to the supply tank 20. Should the fuel fail to flow to the scavenger pump 44 for any reason, an overflow 45 is provided, the level of which is so arranged that the fuel will leave the metering chamber 34 before the fuel level reaches a point where it can flow to the delivery chamber within the assembly.

The fuel overflow line 43 is also connected to the damper control assembly 27 above the damper piston to take care of any fuel leakage past the piston.

Such fuel as is metered to the delivery pump 42, mixed with air drawn from the delivery chamber, is pumped by the delivery pump through line 46 to the delivery nozzle assembly 47. In the nozzle assembly is a solenoid by-pass valve 48, a pressure gauge 50 and a Sylphon bellows valve 51 to give instant cut off of fuel delivery. Any fuel after closing of valve 51 is conveyed through the by-pass valve by line 52 to the return pipe 30 and thence back to the fuel supply tank 20. When the fuel is flowing from the metering chamber through line 46, the electrical by-pass valve 48 is closed and Sylphon bellows valve 51 open, and fuel flows through the distributing nozzle 47 through line 53 to a spring loaded poppet valve set to maintain a given pressure of approximately 100 lbs.

Since air and fuel are under pressure in the line delivered by the pump, and since the air and fuel pass the distributing nozzle together, the air expands very rapidly, producing an atomization of the finely divided stream of fuel which passes the poppet valve in the delivery nozzle. This gives very fine atomization which is easily ignited by the electrodes 55 and 56 with high tension current flowing across the gap.

To aid in securing a high heat release within a small combustion chamber, and air ignition at high air velocities it is found desirable to place a shield or other protective means 57 around the open end of the distributing nozzle toward the combustion space. The exact length of this shield varies with different requirements, but good results are obtained when the shield is sufficiently long to create a reduced air flow in the vicinity of the spark and turbulence directly thereafter.

The delivery pump 42 draws both air and fuel from the metering chamber and imparts a pressure to this mixture which remains under pressure until released at the poppet, for the pump capacity is always greater than the fuel demand. The air expansion at the poppet upon release has a greater atomization, and this atomization is not dependent upon fuel pressure. Even with very little fuel there is plenty of atomization, for there is always air pressure being built up by the pump 42. Not all of the fuel particles meet with combustion immediately upon atomization, but some are carried into the fire box of the boiler 58 and are vaporized upon impact with these hot surfaces.

Figure 2:
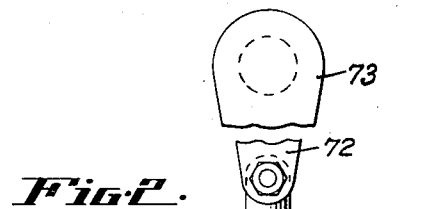
Fig. 2 is a vertical section showing in detail the damper control means.
Figure 2:
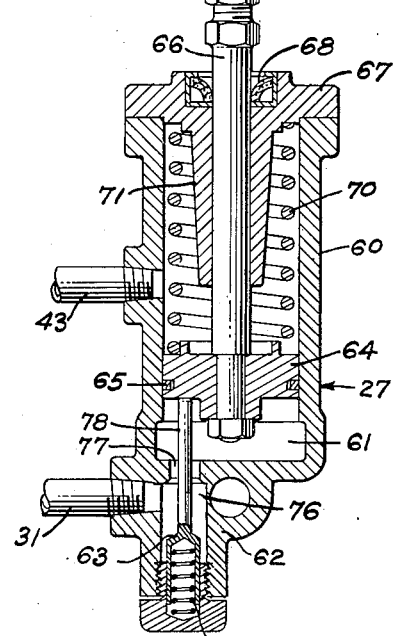

The damper control means 27 consists of a cylinder 60, chamber 61 and an extended portion 62 through the fuel inlet line 31 feeds and is controlled by inlet valve 63. In the chamber 61 is positioned the piston head 64, with ring 65, and rod 66, as well as spring 70 against which the piston works. The closure member for the cylinder 60 is shown as 67 in Fig. 2, and is provided with concentric portion 71 in which a rod 66 rides. The closure member 67 may also be provided with an oil seal 68. Communicating with the portion of the chamber 61 in which the spring 70 is located, is the fuel return line 43 to take care of any leakage past the piston 64. The movement of the piston is transferred to the pitman 72 which in turn is attached to wrist pin 73 located at one extremity of the arm 74, firmly attached to the damper leaf 32. When the piston is in the position shown in Fig. 2, the damper leaf is closed, and as the piston moves upwardly, arm 74 is moved upwardly likewise, opening damper 32. In Fig. 1 there is shown a damper composed of two damper leaves. In order to move these in unison, arm 74a is attached to damper leaf 32a by means of link 75 which is substantially parallel to the piston rod 66. When the magnetic by-pass valve 26 is closed, a fuel pressure is built up in the line 31 and when the fuel pressure entering through the chamber 76 in the extended portion of the cylinder, and thence through aperture 77 and against the piston head 64 is sufficient it will force the piston upwardly against the spring 70 and open the damper 32. The first half of the piston stroke is very rapid, there being no obstruction in the aperture 77. However, in the last half of the stroke, the valve 63, the stem 78 of which is held in contact against the piston head 64 by means of tension spring 80, gradually obstructs the aperture 77 until at the end of the stroke the valve 63 seats at the mouth of the aperture 77, thus stopping the flow of fuel to the piston head. The result is that the damper opens rapidly for the first part of its motion, and then slowing in the second half of its stroke, allowing the fire to light before the maximum air flow is obtained on full opening. When the pressure is released, in the line 31, the valve 63 acts as a check valve, and is opened by the flow of fuel therethrough, and the damper closes rapidly for the entire stroke.

Figure 3:
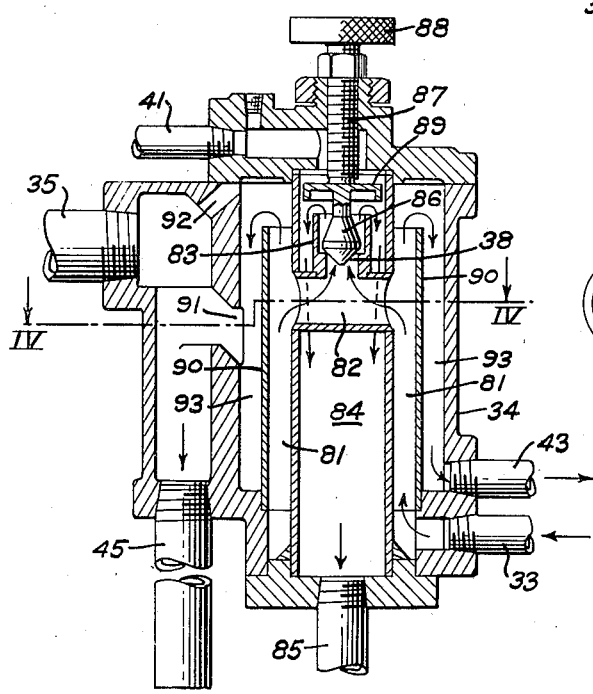
Fig. 3 is a vertical section showing the details of the metering chamber.
Figure 4:
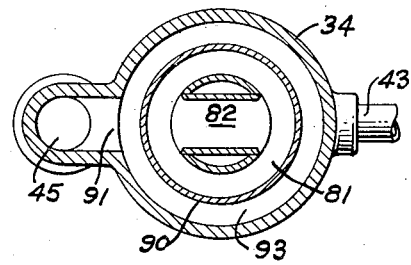
Fig. 4 is a transverse section of the metering chamber taken on the line IV—IV of Fig. 3.

The fuel metering chamber 34 may best be understood by reference to Fig. 3, which is a vertical section, and Fig. 4, which is a horizontal section.

The fuel enters by line 33 near the lower end of the metering chamber, and passes upwardly in an inner cylindrical chamber 81. In this chamber the fuel is subjected to the pressure brought about by the impact tube 35, which conveys directly the pressure created by the blower 37. The fuel passes through a cross opening 82 joining opposite sides of the cylindrical chamber 81, then passes upwardly, up through the metering orifice 38 and spills over the tubular baffle 83, mixes with air from the venturi and then passes down into the central chamber 84. This is the source of supply for the requisite air in the fuel mixture. The mixture then passes to the fuel delivery pump 42, through line 85. As has been stated before, the flow of liquid through the metering orifice 38 is facilitated by the negative pressure created in the Venturi tube 40 and conveyed to the chamber by line 41. 89 is a deflector plate preventing the mixture from splashing into the passageway leading from negative pressure line 41. The amount of mixture passing through the metering orifice is controlled by the valve 86, which is adjusted by means of thumb screw 87 with knurled knob 88. The excess fuel passes over the cylindrical wall 90 and passes out through line 43 which is connected to the scavenger pump 44 to be delivered to the fuel tank 20. In the event the scavenger pump will not return the fuel through line 43, the level will rise until the fuel overflows at 91 and is returned to the supply tank 20 by line 45. The cylindrical wall 90 which controls the level of liquid in the chamber is lower than the spill-over baffle 83. This is so made intentionally so that if there is any failure at the metering valve no fuel will be delivered to the fuel pump 42 through the line 85.

The passage 92 is an air vent to assist the flow of fuel through the passage 91 and 45 in the event the level rises above the limits of that opening.

The burner delivery assembly 47 and nozzle are best understood by reference to Fig. 5, the nozzle portion of which lies within the air duct 36 at the opening of the fire box in the boiler 58. This assembly is specifically designed, both as to mechanism and as to physical location, to bring about a quick shut-off of fuel when the fire is shut-off. When fuel is being delivered to the nozzle, the flow enters by line 46 and passes along line 94, along which it gives up its pressure reading to gauge 50. The pressure in the line 94 forces the valve point 95 of the Sylphon bellows valve to open and the fuel flows to fuel supply line 53, and thence to the nozzle assembly. Threaded plugs 96 and 97 are merely for clean out purposes in the assembly. The poppet valve 54 acts against spring 98 and is adjusted to open the nozzle at about 100 lbs. per square inch. The mixture of fuel and air is conducted to the valve seat by duct 100 and the expansion taking place upon release causes the mixture to issue as a finely atomized cone-shaped spray.

When the fire is stopped, an electrical circuit is set up actuating the solenoid 48 and opening the valve by pulling away the stem 101. Upon the opening of valve 101 there is immediate pressure released in line 94 and 102 so that there is not longer sufficient pressure to actuate the Sylphon bellows valve 51, and the circuit of fuel delivery is through inlet line 46, through line 102, through valve 101, and to the return line 52. Thus, the moment the fire is shut off, there is an immediate stoppage of the fuel supply to the nozzle 54 and its proximity means that its supply is very limited after the shut-off. In fact, it is almost negligible.

*Operation*

Inasmuch as this particular control method does not concern the rules and methods for initially starting the system, but rather a control system operative when the preliminary steps are completed, the description will proceed as of the time when the steam has been generated to a pressure over and above that required for the actual operation or application for which the steam is required. Such a situation, therefore, assumes at the outset that the pressure is up, the fire is shut off, the incoming water is shut off, and, in fact, everything is out of operative engagement, with one exception. When everything else in the system is shut off, there is always a constant circulation of fuel in the circuit from the tank 20 through the line 21 to the filter 22, through the pump 24, through solenoid by-pass valve 25, thence to the tank 20 through the return line 30. This is true regardless of the position of the various switches in the control panel 104. When the boiler pressure has dropped due to the use of the steam such as the opening of the throttle or where the auxiliary equipment (not shown) has run long enough, then the pressure control switch 105 closes. The fire comes on only in response to thermostat control 106 where the thermostat closes switches in response to the temperature of the boiler tubing 106a, and three (106b, c and d) or more temperature take-offs to the thermostat on the interior of the tubing. The usual connections to accomplish this are contemplated and since they are obvious to those skilled in the art, no further description is necessary. Thus, when both the temperature and pressure reach the normal operating maximum, then all of the switches on the control panel 104, both thermostat and pressure control, the solenoids of valves 26 and 48 are energized to close instantly. Upon the closing of valve 26, the fuel being pumped by pump 24 from tank 20 gradually builds up a pressure in line 31 and in valve 28. When the pressure reaches about 40 lbs. per square inch, it will be sufficient to overcome the pressure of the spring 70 against the piston head 64 and cause it to move. In order to reach the piston head the fuel under pressure comes in through line 31 into the small chamber 76 and up through the orifice 77 into the chamber 61. The first half of the stroke upwardly will be rapid as the full pressure in the line is exerted against the piston head, but as the fuel forces the piston head upward, the aperture 77 is gradually being closed by the valve 63 seating therein, thus making the amount of fuel flowing into the chamber 61 gradually less and less down to zero at the end of the stroke when the valve 63 seats therein and closes the aperture. The movement of the piston head is transferred by rod 66 and crank 73 and by means to arm 74 which operates to open the damper leaf 32. This is shown in the drawings to be operated in multiple by means of parallel links 75 operating leaf 32a upon the opening of the damper leaves, air in the duct is delivered to the burner rapidly at the first half and slowing in the second half until maximum air flow is reached on the full opening. At the full stroke of the piston 64 the air supply to the burner assembly 47 is at its maximum. The reason for the short rapid first half of the stroke is to quickly supply the burner with air but at the same time not supply too much, or even the maximum amount, until the burner gets adequately started.

Although the piston 64 in the damper control assembly 27 is being moved upwardly, pressure continues to be built up in the line 31 and to valve 28. Valve 28 is in effect a pressure release valve for the damper control and is set to open as it may be spring loaded at about a pressure of 50 lbs. per square inch. Immediately upon the opening of valve 28, fuel flows through the line 33 to the metering chamber 34 where it enters into the annular chamber 81. In the annular chamber 81 the fuel receives the pressure of the air duct 36 brought in by pressure tube 35. The air pressure forces the fuel upwardly through the metering orifice 38. In passing over the annular weir 83 and going on down into chamber 94, air and fuel continue to mix, and the operation of flow and mixing is further aided by the vacuum or negative pressure produced by the Venturi tube 40 and conveyed to the metering chamber just above the metering orifice by the line 41. A plate 89 prevents any of the mixed fuel and air from splashing up into the line 41 to the metering chamber. In the event there is any excess fuel which does not flow through the metering orifice 38, and accumulates in chamber 81, the level fills up and finally goes over annular wall 90 into another annular chamber 93 and out through line 43 and back to the return line 30 by means of scavenger pump 44. If, for any reason, the scavenger pump or return line should refuse or fail to function, then, in order to prevent the fuel from flooding through the fuel supply line and out into the boiler through the burner nozzle, there is an opening 91 to carry off the overflow to the line 45 from which it may be dumped. The amount of mixture passing through the orifice 38 may, of course, be adjusted and regulated by means of screw 87. The metered fuel and air mixture from the central chamber passes by means of line 85 to the fuel supply pump 42, where both the fuel and air mixture is pumped under pressure by line 46 to the burner assembly 47.

The solenoid valve having been activated and energized, the valve 101 is seated and in closed position, the fuel enters line 94 and the pressure forces down the valve stem 95 of the Sylphon bellows and allows the fuel and air mixture to proceed on through line 53 up to the outlet 100 to the poppet valve 54. As air under pressure expands very rapidly, the expansion of air upon release at the valve 54 results in a fine and complete atomization of the fuel delivered.

The flow of air in the duct 36 determines the pressure in the metering chamber, and the pressure in the metering chamber determines the amount of fuel going to the burner, after the adjustment of the metering aperture 38 has been made.

At the time the fuel and air mixture is delivered in atomized form from the poppet valve 54, contact (not shown) has been made supplying current to electrodes 55 and 56, causing an arc to pass therebetween, and ignite the fuel supply to furnish heat for the boiler 58.

As is clearly shown by Fig. 1, if any one of the switch contacts is broken, the solenoids of valves 26 and 48 are immediately de-energized and closed, thus stopping fuel supply to the burner assembly at two points. Valve 48 is preferably positioned close to the burner in order to secure quick cut-off of the fire, and also to have as little lag as possible from fuel remaining in the supply line. Therefore, it is readily seen that if the pressure of the steam gets too high the contact 105 is opened; if the tube temperature gets too high—above normal operation—the contact 106a is opened; or if any one of the three switch 106b, 106c, or 106d on the steam temperature in the tubes gets above normal, the circuit is opened; and the breaking of any one of these contacts is sufficient to de-energize the solenoids and stop the fuel through the system, excepting, of course, the original circuit described at the beginning of the operation.

Thus, there is a complete control system adjustable to any temperature or pressure with immediate response and takes the operation out of the range of human error.

I claim:

1. A boiler control assembly for normal operation of steam generators comprising in combination a burner, means for supplying liquid fuel fed under pressure to said burner, air supply means conveying air to the combustion chamber, and means for metering the amount of fuel under pressure in proportion to the pressure due to velocity head of the air flow to the combustion chamber and mixing said fuel with air prior to delivery to said burner.

2. A boiler control assembly for normal operation of steam generators comprising in combination a burner, means for supplying liquid fuel fed under pressure to said burner, air supply means conveying air to the combustion chamber, means responsive to the fuel pressure for controlling the air supplied to the burner, means for conveying both positive and negative pressures from the air supply to the metering means and means for metering and mixing with air the amount of fuel under pressure in proportion to the pressure of the air flow.

3. A boiler control assembly for normal operation of steam generators comprising in combination a burner, having a poppet valve spray nozzle for atomizing fuel, means for supplying liquid fuel fed under pressure to said burner and nozzle, a nozzle air supply means conveying air to the combustion chamber, means for conveying the pressure due to velocity head from the air supply to the metering means and means for metering the amount of fuel and mixing it with air for delivery to said burner in proportion to the pressure due to velocity head of the air flow.

4. In a boiler control assembly for normal operation of steam generators comprising in combination a burner assembly, means for supplying liquid fuel under pressure to the system, air supply means including a duct to the burner assembly supplying air for combustion purposes, means associated with said duct and responsive to fuel supply pressure for actuating and admitting air to the burner assembly for combustion purposes, and means for metering the amount of fuel to be supplied to the said burner in relation to the pressure of air in said air supply.

5. In a boiler control assembly for normal operation of steam generators comprising in combination a burner assembly, means for supplying liquid fuel under pressure to the system, air supply means including a duct to the burner assembly supplying air for combustion purposes, means associated with said duct and responsive to fuel supply pressure for actuating and admitting air to the burner assembly, means for metering the amount of fuel to be supplied to the said burner in relation to the pressure of air in said air supply and mixing the same with air, and pump means for supplying such mixture of fuel and air to the burner under pressure.

6. In an automatic boiler control method, the step of supplying fuel to the burner under pressure where air is supplied for purposes of combustion the amount of air pressure due to velocity head of the supply determines the amount of fuel flowing to the burner and mixing air with the fuel so supplied.

7. A method for automatically securing boiler control including the step of supplying fuel to a burner located in an air supply duct supplying air for purposes of combustion and under pressure, and the step of controlling the amount of fuel so supplied by the pressure due to velocity head of the supply in the air duct and at the same time mixing air therewith.

8. A method for automatically securing boiler control in normal operation including the step of supplying a mixture of air and fuel to a burner located in an air supply duct supplying air for purposes of combustion and under pressure, and the step of controlling the amount of fuel so supplied in proportion to the velocity head of the supply in the air duct flowing to the point of combustion.

9. A burner assembly comprising a solenoid by-pass valve for diverting the fuel to the return line when fuel is not to be needed, a syphon bellows valve operable by pressure in the fuel line to pass fuel to the poppet valve, and a poppet valve adapted to release the fuel in a finely atomized spray.

10. A unit burner assembly comprising a solenoid by-pass valve for diverting the fuel to the return line when fuel is not to be needed, a Sylphon bellows valve operable by pressure in the fuel line to pass fuel to the poppet valve, a poppet valve adapted to release the fuel in a finely atomized spray, and a shield to protect combustion from the force of an air supply and to create a turbulence.

11. A metering chamber for metering liquid fuel in proportion to the flow of air for combustion in an outside source and mixing the metered fuel with air comprising a chamber for receiving a fuel supply, means for applying air pressure from said outside source to proportion said fuel in direct relation to the pressure of the air supply and causing air to mix therewith, and additional adjustable means for regulating the quantum of mixture passing therethrough.

12. A metering chamber for metering liquid fuel in proportion to the flow of air for combustion in an outside source and mixing the metered fuel with air comprising a chamber for receiving a fuel supply, means for applying air pressure from said outside source to proportion the supply of said fuel in direct relation to the pressure of said air supply and causing air to mix therewith, adjustable additional means for regulating the amount of mixture passing therethrough, whereby the pressure due to velocity head of air supplied for combustion determines the rate of flow of the mixture of fuel and air.

13. A metering chamber for metering liquid fuel in proportion to the flow of air in an outside source and mixing the metered fuel with air, comprising a chamber for receiving the fuel, means for conveying positive air pressure due to velocity head from said outside source to said chamber, an outlet from said chamber with adjustable means for regulating the size of said outlet and a second chamber for receiving the mixed air and fuel.

14. A metering chamber for metering liquid fuel in proportion to the flow of air in an outside source and mixing the metered fuel with air, comprising in combination a chamber for receiving the fuel, means for conveying positive air pressure due to velocity head from said outside source to said chamber, a baffled outlet from said chamber for breaking up the fuel whereby air and fuel become mixed, adjustable means for regulating the size of said outlet, means for conveying a negative air pressure from the same outside air source to the discharge side of said outlet to facilitate the flow of fuel and a second chamber for receiving the mixed air and metered fuel.

15. In a boiler control assembly for the normal operation of steam generators comprising in combination, a burner assembly located in an air duct, a primary liquid fuel circuit for feeding metered fuel under pressure to the burner assembly operative only when the fire is on, a secondary fuel circuit for by-passing the fuel from the primary liquid fuel circuit operative only when the fire is off said liquid fuel in the primary circuit being metered in proportion to the air pressure due to velocity head of the air flow in said duct.

16. In a boiler control assembly for the normal operation of steam generators comprising in combination, a burner assembly, a primary liquid fuel circuit for feeding metered fuel under pressure to the burner assembly operative only when the fire is on, a secondary fuel circuit for by-passing the fuel from the primary liquid fuel circuit operative only when the fire is off, air supply means, means responsive to the fuel pressure for admitting air to the burner, means in said primary fuel circuit for metering the liquid fuel in the primary circuit in proportion to the air pressure due to velocity head of the air flow, pressure and thermostatic electrical circuits for automatically cutting off the primary fuel circuit and starting the secondary circuit above or below the limits of normal operation and cutting in the primary circuit within said limits.

17. In apparatus for the normal operation of steam generators comprising in combination, a burner, means for supplying liquid fuel under pressure, an air supply for combustion, means associated with said air supply and responsive to the fuel supply pressure regulating the amount of air supplied to the burner for combustion purposes, means for metering the amount of fuel in proportion to the velocity head in said air supply, cut-off means associated with said fuel supply means operative in response to temperatures and pressures above and below normal operation of the steam generator.

18. In apparatus for the normal operation of steam generators comprising in combination, a burner assembly, means for supplying liquid fuel under pressure, air supply means for combustion, means associated with said air supply and responsive to the fuel supply pressure for regulating the amount of air delivered for combustion purposes, means for metering the amount of fuel to be supplied to said burner assembly in relation to the velocity head in said air supply and simultaneously mixing air therewith, pump means for supplying said mixed fuel and air to the burner assembly and cut-off means associated with said fuel supply means and said burner assembly operative to instantaneously interrupt both the supply of fuel and the supply of mixed fuel and air in response to temperatures and pressures above and below normal operations of the steam generator.

19. A method for automatically securing boiler control including, the step of supplying fuel to a burner located in an air duct supplying air for combustion and under pressure, the step of controlling the amount of fuel so supplied in accordance with the pressure due to the velocity head of the air being supplied, and the step of interrupting the said fuel supply means and therefore the boiler operation, whenever the pressures or temperatures become higher than the normal operating range for the said boiler.

20. A method for automatically securing boiler control in normal operation including the step of supplying a mixture of air and fuel to a burner located within an air supply duct conveying air for purposes of combustion and under pressure, the step of controlling the amount of fuel so supplied and mixed in direct proportion to the pressure of the air being delivered and the step of interrupting both the supply of air and the mixture of fuel and air at the burner whenever the temperatures or pressures are without the normal operating range of the boiler.

WILLIAM J. BESLER.